US012166276B1

(12) United States Patent
Ignatenko et al.

(10) Patent No.: US 12,166,276 B1
(45) Date of Patent: Dec. 10, 2024

(54) DEPLOYABLE OMNIDIRECTIONAL ANTENNA FOR GROUND COMMUNICATION

(71) Applicant: CUSTOM MICROWAVE INC., Longmont, CO (US)

(72) Inventors: Maxim Vladimirovich Ignatenko, Superior, CO (US); Philip Elwood Venezia, Longmont, CA (US); Sudhakar Krothapalli Rao, Rancho Palos Verde, CA (US); Clency Lee Yow, Niwot, CO (US); Richard Malcolm Dart, Arvada, CO (US)

( * ) Notice: Subject to any disclaimer, the term of this patent is extended or adjusted under 35 U.S.C. 154(b) by 0 days.

(21) Appl. No.: 18/629,776

(22) Filed: Apr. 8, 2024

(51) Int. Cl.
*H01Q 1/27* (2006.01)
*H01Q 9/04* (2006.01)
*H01Q 13/04* (2006.01)

(52) U.S. Cl.
CPC ........... *H01Q 1/273* (2013.01); *H01Q 9/0421* (2013.01); *H01Q 13/04* (2013.01)

(58) Field of Classification Search
CPC ....... H01Q 1/273; H01Q 9/0421; H01Q 13/04
See application file for complete search history.

(56) References Cited

U.S. PATENT DOCUMENTS 9,711,868 B2 * 7/2017 Scheucher ............. H01Q 19/30
2012/0280869 A1 * 11/2012 Kirkham ................ H01Q 1/273 343/718
2013/0009832 A1 * 1/2013 Apostolos .............. H01Q 1/273 343/730
2015/0333391 A1 * 11/2015 Pryor ..................... H01Q 1/273 343/718
2021/0175601 A1 * 6/2021 Gannon ................. H01Q 1/273
2022/0057582 A1 * 2/2022 Kadar .................. G02B 6/3897

* cited by examiner

*Primary Examiner* — Hai V Tran
*Assistant Examiner* — Michael M Bouizza
(74) *Attorney, Agent, or Firm* — Novel Patent Services

(57) ABSTRACT

A deployable manpack antenna assembly comprises a transceiver antenna unit, a first support rod, a flexible conduit connector, a second support rod, a base unit, a latching unit, a clamping unit, and at least two sleeve retainer stops. The deployable manpack antenna assembly is configured for use in military applications, particularly relating to ground-party communications systems intended to be used in both communications-at-the-halt (CATH) and communications-on-the-move (COTM). The manpack antenna assembly operates in Ku, K and Ka bands for soldiers in the battlefield. The manpack antenna assembly comprises one of the two antennas, a biconical variant antenna, or an inverted-F variant antenna, both of which operate at Ku-band, K-band, and Ka-band simultaneously. The manpack antenna assembly boasts several features, including antenna deployment from folded to unfolded configurations, compact size, low mass, near 4π steradians coverage, low cost, wide bandwidth performance, and built-in radome for protection from severe environmental conditions.

20 Claims, 11 Drawing Sheets

404

406

600

700

702

704

800

802

DEPLOYABLE OMNIDIRECTIONAL ANTENNA FOR GROUND COMMUNICATION

The present disclosure relates generally to wide angle coverage compact antennas for ground communications, and more particularly to deployable antennas that provides wide-angle 4π steradians coverage for man-pack radio communication units carried by soldiers on the ground.

BACKGROUND

Modern military communications rely heavily on equipping individual soldiers with information technology. It involves equipping soldiers with networked information and communication technologies to enhance situational awareness, improve decision-making, and increase lethality on the battlefield. Many countries are actively developing and fielding individual soldier information systems. These systems typically consist of wearable or portable devices that provide soldiers with real-time data access, secure communication capabilities, and enhanced navigation and targeting functionalities. Effective wireless communication is crucial for these functionalities to operate seamlessly, making reliable antennas essential for successful soldier reliance on information technology.

Wireless communication, using radios, can be employed for communication on land, in the air, at sea, or even across vast distances. Point-to-point communication on the ground is commonly achieved with antennas like monopoles or dipoles. For instance, a dipole antenna has two elements, each roughly a quarter wavelength long, arranged in a shared axial alignment with a small gap between them. Each element receives current 180 degrees out of phase with the other. A monopole antenna, on the other hand, has a single element, also about a quarter wavelength long, and it operates in conjunction with a ground plane that acts as a substitute for the missing second element.

Monopoles and dipoles work best for line-of-sight (LOS) communication and are not suitable for wide angle coverage applications. However, mountains, long distances due to Earth's curvature, or other obstacles can block LOS signals. The success of LOS communication depends on the relative positions and heights of the transmitter and receiver, along with the transmitter's power and receiver's sensitivity.

Equipping individual soldiers with reliable and protected communication capabilities is paramount for successful military operations. However, current solutions face significant challenges in the field such as limited deployment, and handheld antennas thereof. Typically, only one soldier per unit carries a radio for satellite communication. This creates a bottleneck for information flow and limits communication redundancy within the unit. The handheld antennas such as pistol grip antennas offer some portability, they require soldiers to use one hand for operation, hindering their ability to handle weapons or perform other tasks. This is a critical drawback in combat scenarios.

Further, mounting antennas on rucksacks frees up soldiers' hands but introduces other problems. The deployed antenna's design can be bulky and snag on objects, potentially causing damage. This can disrupt communication at crucial moments. Rucksack-mounted antennas can increase a soldier's profile, making them and their unit more easily detectable by enemies. This can compromise their position and endanger the entire unit. As the existing antennas present challenges, future protected forward communications (PFC) systems for ground and air platforms demand innovative antenna solutions.

Man-pack radios deployed by ground troops require operation across multiple frequency bands, including K-band. This necessitates the development of compact antennas that are capable of achieving full 4π steradian coverage for omnidirectional communication. However, the existing antennas present significant challenges in deployment mechanisms. Even antennas with functional deployment may not achieve the dual functionality of operational readiness during "communications on the move" (COTM) and a stowed/folded configuration on the man-pack during "communications at the halt" (CATH), without compromising communication integrity. Therefore, current antenna technology is incapable of simultaneously fulfilling these critical requirements such as wide angular coverage, bandwidth, and flexible deployment.

Therefore, there is a need for deployable antennas that provide wide-angle 4π steradians coverage for man-pack radio communication units carried by soldiers on the ground. There is also a need for compact antennas with efficient deployment mechanisms. There is also a need for deployable antennas that provide low data communications for soldier's in battle field at multiple frequency bands. There is also a need for the development of advanced antennas that can provide both compact stowage and uninterrupted 4π steradians coverage during COTM and CATH scenarios.

SUMMARY OF THE INVENTION

The following presents a simplified summary of one or more embodiments of the present disclosure to provide a basic understanding of such embodiments. This summary is not an extensive overview of all contemplated embodiments and is intended to neither identify key nor critical elements of all embodiments, nor delineate the scope of any or all embodiments.

The present disclosure, in one or more embodiments, relates to a deployable manpack antenna assembly comprises a transceiver antenna unit, a first support rod, a flexible conduit connector, a second support rod, a base unit, a latching unit, a clamping unit, at least two sleeve retainer stops. The deployable manpack antenna assembly is configured for use in military applications, particularly relating to ground-party communications systems intended to be used in both communications-at-the-halt (CATH) and communications-on-the-move (COTM). The deployable manpack antenna assembly comprises a mechanically deployable assembly that allows for both stowed and deployed configurations. In one embodiment, the mechanically deployable assembly comprises the flexible conduit connector that connects the first support rod with the second support rod. The mechanically deployable assembly further comprises the latching unit, and the clamping unit.

In one embodiment, the transceiver antenna unit is attached at one end of the first support rod. The transceiver antenna unit is configured to provide substantially omnidirectional coverage. In one embodiment, the transceiver antenna unit is attached to the first support rod through an attachment unit. In one embodiment, the transceiver antenna unit comprises a bi-conical variant antenna, or an inverted-F variant antenna. Both antenna units employ identical mechanical deployment structure that works in two states, stowed configuration when the soldier is lying on the ground, and deployed configuration when the soldier is on the move.

In one embodiment, the base unit is attached at one end of the second support rod. The second support rod is releasably engaged with the first support rod through the clamping unit in the stowed configuration. The base unit comprises a mounting flange, at least one communication cable, and a terminal coaxial connector. The mounting flange is extending radially from the second support rod. The communication cable is passed through the mounting flange and traverses the second support rod. The terminal coaxial connector is mounted to the mounting flange, receiving the communication cable. The terminal coaxial connector is electrically connected to the communication cable. The terminal coaxial connector is configured to electrically connect the transceiver antenna unit to an external terminal.

In one embodiment, the latching unit is configured to releasably fix the orientation of the first support rod relative to the second support rod in the deployed configuration. The latching unit includes, but not limited to, a sleeve, a first sleeve retainer stop and a second sleeve retainer stop.

In one embodiment, the sleeve is configured to be slidably mounted onto the first support rod, adjacent to the flexible conduit connector. The sleeve is configured to slide over the flexible conduit connector to fix the second support rod and the first support rod in the deployed configuration. The first sleeve retainer stop is mounted to the second support rod, proximal to the flexible conduit connector, wherein the second sleeve retainer stop is mounted to the first support rod, proximal to the transceiver antenna unit.

In one embodiment, the clamping unit includes at least one connector configured to enable a user to detachably connect the first support rod with the second support rod.

In another embodiment, the clamping unit includes at least one stowage clamp. The stowage clamp comprising a collar, a connecting strut, and a clasp. The collar is configured to be rotatably connected to the second support rod between the flexible conduit connector and the base unit. The connecting strut is configured to be laterally mounted to the collar, perpendicular to the second support rod. The clasp is configured to be terminally connected to the connecting bar, positioned across the connecting bar from the collar. The first support rod being releasably engaged to the clasp, wherein the stowage clamp fixes the second support rod and the first support rod into the stowed configuration.

A cable conduit traverses the first support rod, the flexible conduit connector, and the second support rod. The cable conduit is configured to receive at least one communication cable, which is connected between the transceiver antenna unit and the base unit. The communication cable defines a signal-carrying filament or other coaxial cables utilized as a signal carrier for incoming and outgoing signals.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

The accompanying drawings, which are incorporated in and constitute a part of the specification, illustrate an embodiment of the invention, and, together with the description, explain the principles of the invention.

DETAILED DESCRIPTION

Figure 1A:
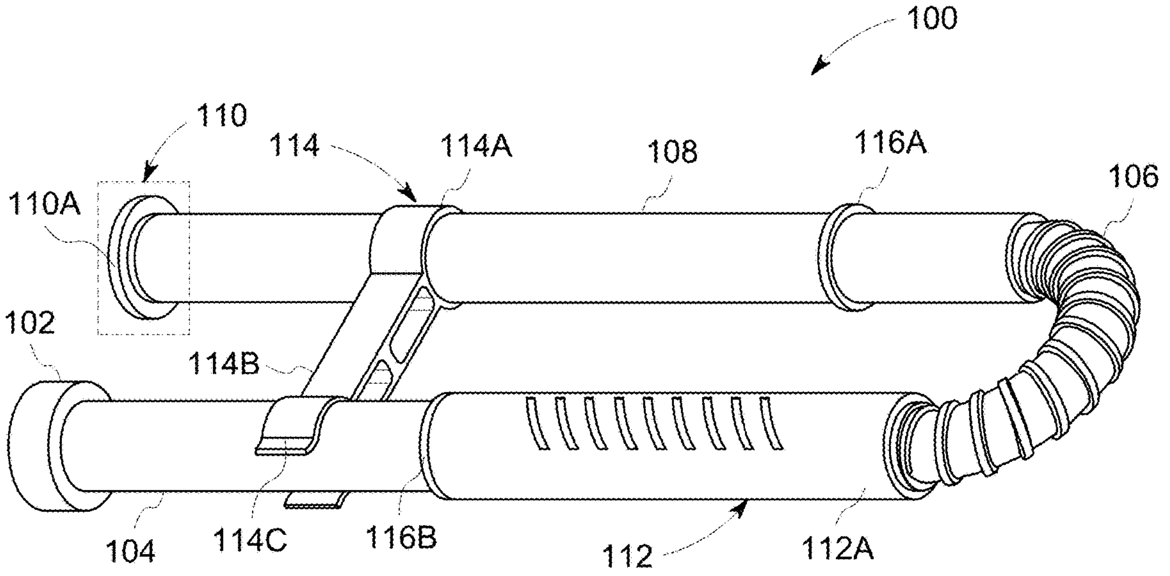
FIG. 1A illustrates a perspective view of a deployable manpack antenna assembly in a stowed configuration, in accordance with embodiments of the invention.

Reference will now be made in detail to the present preferred embodiments of the invention, examples of which are illustrated in the accompanying drawings. Wherever possible, the same reference numerals are used in the drawings and the description to refer to the same or like parts.

Figure 1B:
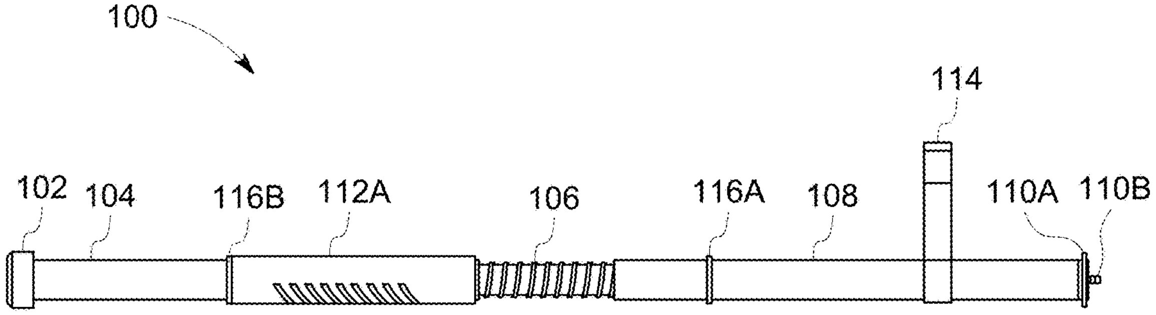
FIG. 1B illustrates a perspective view of the deployable manpack antenna assembly in a deployed configuration, in accordance with embodiments of the invention.

FIG. 1A refers to a perspective view of a deployable manpack antenna assembly 100 in a stowed configuration wherein the soldier is lying on the ground. FIG. 1B refers to a perspective view of the deployable manpack antenna assembly 100 in a deployed configuration wherein the soldier is on the move. The deployable manpack antenna assembly 100 comprises a transceiver antenna unit 102, a first support rod 104, a flexible conduit connector 106, a second support rod 108, a base unit 110, a latching unit 112, a clamping unit 114, at least two sleeve retainer stops (116A, 116B). The deployable manpack antenna assembly 100 is configured for use in military applications, particularly relating to ground-party communications systems intended to be used in both communications-at-the-halt (CATH) and communications-on-the-move (COTM). The deployable manpack antenna assembly 100 comprises a mechanically deployable assembly that allows for both stowed and deployed configurations. In one embodiment, the mechanically deployable assembly comprises the flexible conduit connector 106 that connects the first support rod 104 with the second support rod 108. The mechanically deployable assembly further comprises the latching unit 112, and the clamping unit 114.

In one embodiment, the transceiver antenna unit 102 is attached at one end of the first support rod 104. The transceiver antenna unit 102 is configured to provide substantially omnidirectional coverage.

In one embodiment, the transceiver antenna unit 102 is attached to the first support rod 104 through an attachment unit. The attachment unit comprises, but is not limited to, clamp-based attachments, flange-based attachments, pipe-based attachments, and quick-release attachments, thereof. In another embodiment, the transceiver antenna unit 102 is attached to the first support rod 104 through a plurality of plastic pins. The plastic pins firmly secure the transceiver antenna unit 102 to the first support rod 104.

Figure 2A:
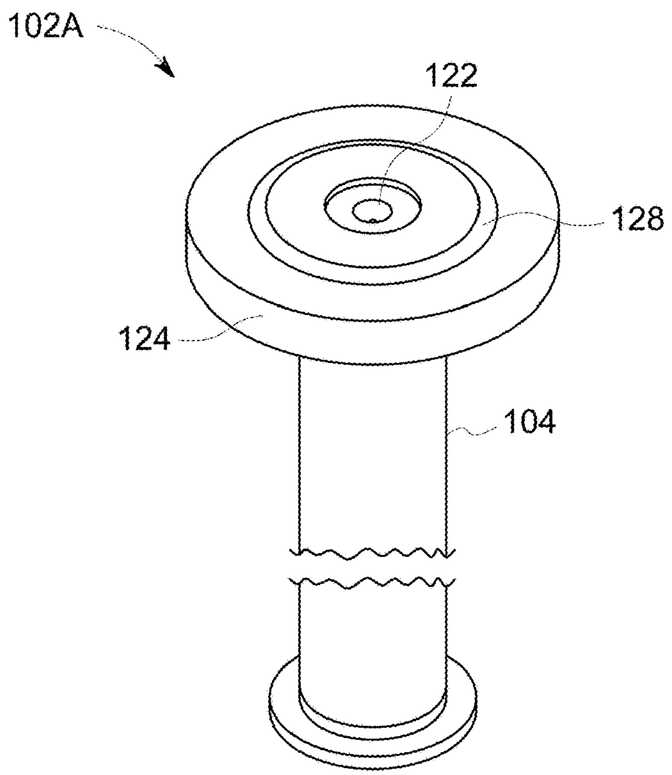
FIG. 2A illustrates a perspective top view of a bi-conical variant antenna, in accordance with embodiments of the invention.

In one embodiment, the transceiver antenna unit 102 comprises a bi-conical variant antenna 102A, as shown in FIG. 2A.

Figure 3A:
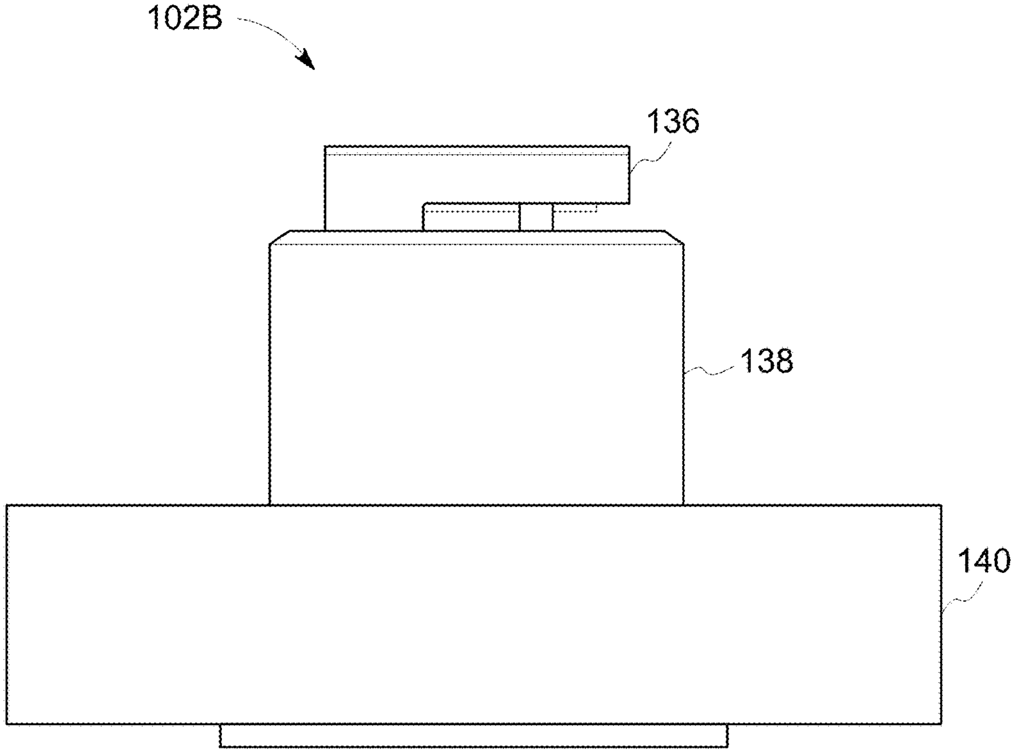
FIG. 3A illustrates a perspective view of an inverted-F variant antenna, in accordance with embodiments of the invention.

In one embodiment, the transceiver antenna unit 102 comprises an inverted F variant antenna 102B, as shown in FIG. 3A.

In one embodiment, the base unit 110 is attached at one end of the second support rod 108. The second support rod 108 is releasably engaged with the first support rod 104 through a clamping unit 114 in the stowed configuration, as shown in FIG. 1A. The clamping unit 114 keeps the two support rods (104, 108) at a fixed distance apart and keeps them rigid during the operational scenario. The base unit 110 comprises a mounting flange 110A, at least one communication cable 118, and a terminal coaxial connector 110B. The mounting flange 110A is extending radially from the second support rod 108. The communication cable 118 is passed through the mounting flange 110A and traverses the second support rod 108. The terminal coaxial connector 110B is mounted to the mounting flange 110A, receiving the communication cable 118. The terminal coaxial connector 110B is electrically connected to the communication cable 118. The terminal coaxial connector 110B is configured to electrically connect the deployable manpack antenna assembly 100 to an external terminal modem.

In one embodiment, the first support rod 104 and the second support rod 108 are at least one of a mast, a pole, an elongated column, and a mounting assembly, thereof. In another embodiment, the first support rod 104, to be primarily composed of non-conductive structural elements such as plastics, polymers, aramid fibers, and other non-metallic materials. This approach is adopted to improve the radio functionality of the deployable manpack antenna assembly 100 by isolating the first conducting base 126 from any ambient radio noise. This prevents the first support rod 104 from acting as a secondary antenna and improves the radiation in the backlobe region where polar angle (θ) from the antenna boresight direction is between 90° and 180° degrees (i.e., $90°<\theta<180°$).

In some embodiments, the use of composite, non-metallic materials ensures that the first support rod 104 and the second support rod 108 does not pose a shrapnel hazard if struck by incoming fire, as it would instead deform or melt rather than shatter. Additionally, using modern composite materials for the first support rod 104 and the second support rod 108 results in a substantial reduction in weight, as these materials boast significantly greater strength-to-weight ratios than conventional wire-wrap antenna masts that are commonly employed in military applications. In one exemplary embodiment, the first support rod 104 and the second support rod 108 are fiberglass rods. In one exemplary embodiment, the first support rod 104 and the second support rod 108 are made of polytetrafluoroethylene (teflon).

In one embodiment, the latching unit 112 is configured to releasably fix the orientation of the first support rod 104 relative to the second support rod 108 in the deployed configuration, as shown in FIG. 1B. The latching unit 112 includes, but not limited to, a sleeve 112A, a first sleeve retainer stop 116A and a second sleeve retainer stop 116B.

In one embodiment, the sleeve (112, 112A) is configured to be slidably mounted onto the first support rod 104, adjacent to the flexible conduit connector 106. The sleeve 112A is configured to slide over the flexible conduit connector to fix the second support rod 108 and the first support rod 104 in the deployed configuration. The first sleeve retainer stop 116A is mounted to the second support rod 108, proximal to the flexible conduit connector 106, wherein the second sleeve retainer stop 116B is mounted to the first support rod 104, proximal to the transceiver antenna unit 102.

In another embodiment, the flexible conduit connector 106 allows easy deployment among CATH and COTM states of the deployable manpack antenna assembly 100. The flexible conduit connector 106 can be easily and conveniently collapsed from an elongated state into a compact state and vice versa, depending on the intended use in CATCH or COTM operations. This user-configurable nature of the flexible conduit connector 106 enhances the overall versatility of the deployable manpack antenna assembly 100, making it well-suited for a wide range of operational scenarios.

In one embodiment, the flexible conduit connector 106 is made of nylon. In some embodiments, the flexible conduit connector 106 acrylonitrile butadiene styrene (ABS), polypropylene, high-density polyethylene (HDPE), and thereof.

In another embodiment, the clamping unit 114 includes at least one connector configured to enable a user to detachably connect the first support rod 104 with the second support rod 108.

In one embodiment, the clamping unit 114 comprises a collar 114A, a connecting strut 114B, and a clasp 114C. The collar 114A is configured to be rotatably connected to the second support rod 108 between the flexible conduit connector and the base unit 110. The connecting strut 114B is configured to be laterally mounted to the collar 114A, perpendicular to the second support rod 108. The clasp 114C is configured to be terminally connected to the connecting strut 114B, positioned across the connecting strut 114B from the collar 114A. The first support rod 104 being releasably engaged to the clasp 114C, wherein the stowage clamp fixes the second support rod 108 and the first support rod 104 into the stowed configuration, as shown in FIG. 1A.

In another embodiment, the clamping unit 114 is a clip release mechanism to fold and unfold the deployable manpack antenna assembly 100. From lying down to standing up positions of the soldier and 2.92 mm coaxial connector 146 that interfaces with a man pack radio.

A cable conduit 120 traverses the first support rod 104, the flexible conduit connector 106, and the second support rod 108. The cable conduit 120 is configured to receive the communication cable 118, which is connected between the transceiver antenna unit 102 and the base unit 110. The communication cable 118 comprises, but not limited to, a signal-carrying filament or other coaxial cables utilized as a signal carrier for incoming and outgoing signals.

In another embodiment, the deployable manpack antenna assembly 100 is a compact wide-angle coverage antenna assembled and configured for use in military applications, particularly relating to ground-party communications systems intended to be used in both communications-at-the-halt (CATH) and communications-on-the-move (COTM) scenarios. In some embodiments, the deployable manpack antenna assembly 100 is prepared for use in hazardous environments by integrating solid protective structures into a novel antennae structure configured for maximal effective bandwidth across most common military radio frequencies. A combination of these two radiation fields provides near 4π steradians coverage at K, Ku, & Ka bands at all times. In one embodiment, the deployable manpack antenna assembly 100 is utilized in conjunction with the flexible conduit connector 106 that is deployable between CATH and COTM communication states by a soldier on the ground, without interrupting communication links at the K, Ku and Ka bands of frequencies.

FIGS. 2A-2E refer to a perspective top view of the bi-conical variant antenna 102A. The bi-conical variant antenna 102A is configured for maximal coverage gain in a direction relative to the first support rod 104, thereby improving the overall minimum gain across entire coverage area. The bi-conical variant antenna 102A comprises a radome 124, the communication cable 118, a first conducting base 126, and a second conducting base 128 arranged into the structure of a hardened bi-conical antenna as previously outlined. The first conducting base 126 and the second conducting base 128 constitute opposing transceiver cones forming the eponymous bi-conical antennae structure.

In contrast to the conventional bi-conical antenna, which typically features a half-cone angle ranging from 20° to 35° and thus results in a wider opening of the radiating aperture, the bi-conical variant antenna 102A utilizes a half-cone angle of 0° to achieve narrower openings of the radiating aperture, resulting in a wider beam. In one embodiment, the communication cable 118 defines a signal-carrying filament or other coaxial cables utilized as a signal carrier for incoming and outgoing signals amplified across the first conducting base 126 and the second conducting base 128. The communication cable 118 is relatively sturdy, insensitive to minor disruptions or displacements of the communication cable 118 relative to the first conducting base 126 or the second conducting base 128 may not compromise overall antennae function by grounding the communication cable 118 or distorting any transmission there through.

In another embodiment, the radome 124 is solidly mounted between the first conducting base 126 and the second conducting base 128 as a protective measure against the myriad hazards of a combat environment, dust, snow, and other environmental hazards.

Figure 2B:
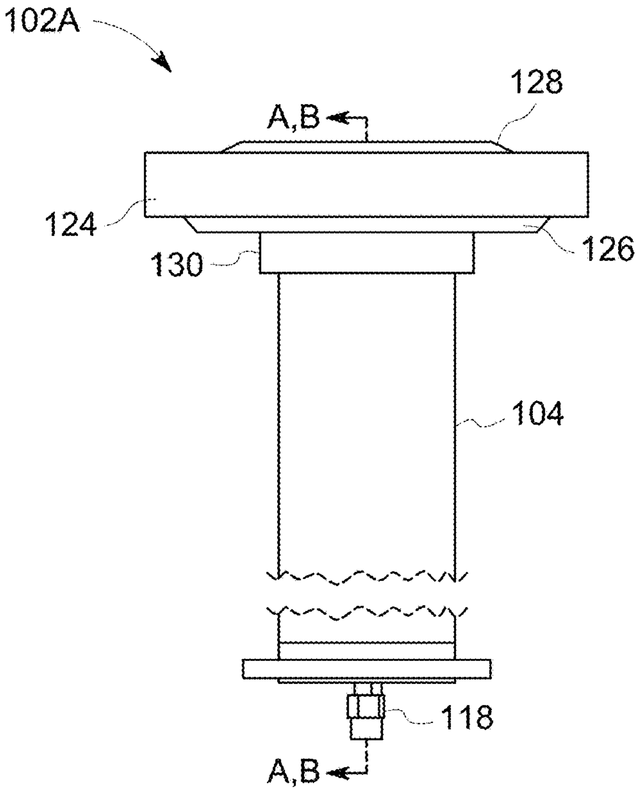
FIG. 2B illustrates a perspective front view of the bi-conical variant antenna, in accordance with embodiments of the invention.

In another embodiment, a transmission gap 132 is disposed between the first conducting base 126, and the second conducting base 128, as shown in FIG. 2B. The transmission gap 132 is configured to serve as a central point for signal relay across the two conducting bases (126, 128) using the communication cable 118. The communication cable 118 traverses from the first conducting base 126, propagating through the transmission gap 132, and finally reaching the second conducting base 128. The radome 124 is situated laterally around the first conducting base 126. By enclosing the transmission gap 132 within the radome 124, the first conducting base 126, also referred to as the 'ground plane', serves as a protective structural element in addition to its conventional role in other antenna configurations.

In another embodiment, the radome 124 is sandwiched between the first conducting base 126 and the second conducting base 128 to lend additional structural rigidity to the overall assembly of the bi-conical variant antenna 102A.

In one embodiment, the bi-conical variant antenna 102A comprises an aperture opening angle of approximately 0° relative to any signal wave produces a broader beamwidth that provides near 4π steradians coverage. By forming a collimated electromagnetic wave through the transmission gap 132, the boresight null zone and backside null zone are minimized.

In an optimal configuration, a resultant null beamwidth between 0° to 180° is minimized to the point of practical irrelevance. In one embodiment, the functional beamwidth between angles 0° and 180° provides coverage of 4π steradians or universal angular coverage along all vectors from the transmission gap 132.

In another embodiment, the structure of the first conducting base 126 and the second conducting base 128 may be configured to selectably expand the backside null zone to reduce scattering effects of any mast or boom structure supporting the present invention.

Figure 2C:
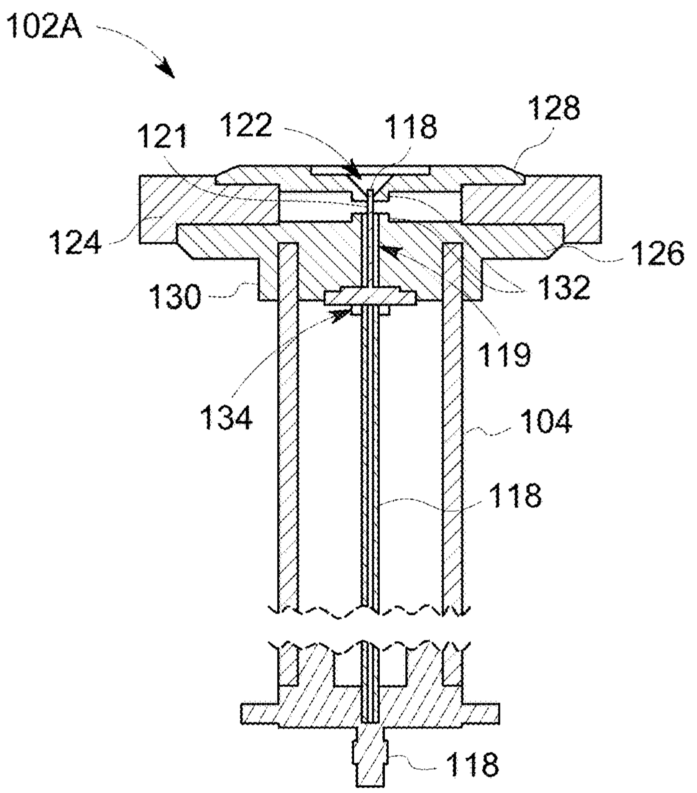
FIG. 2C illustrates a cross-sectional view of the bi-conical variant antenna along line A-A in FIG. 2B, in accordance with embodiments of the invention.

Referring to FIG. 2C, the bi-conical variant antenna 102A is characterized by a first conducting base 126 that has a larger diameter than the second conducting base 128, which conventionally serves as the ground plane. This difference in size intentionally distorts the functional beamwidth at both poles of the antenna. Specifically, the beamwidth between 0° and 90° is wider than the beamwidth between 90° and 180°, as illustrated in FIGS. 4A-4D. The corresponding reduction in the second beamwidth near to 180° is functionally offset by the reduction in signal-scattering that occurs when the first support rod 104 is placed directly adjacent to the second conducting base 128.

In another embodiment, the structure of an asymmetric bi-conical antenna is defined along a backside-boresight vector collinear to the manpack or mobile communications terminal typically employed by combat controllers.

Figure 2D:
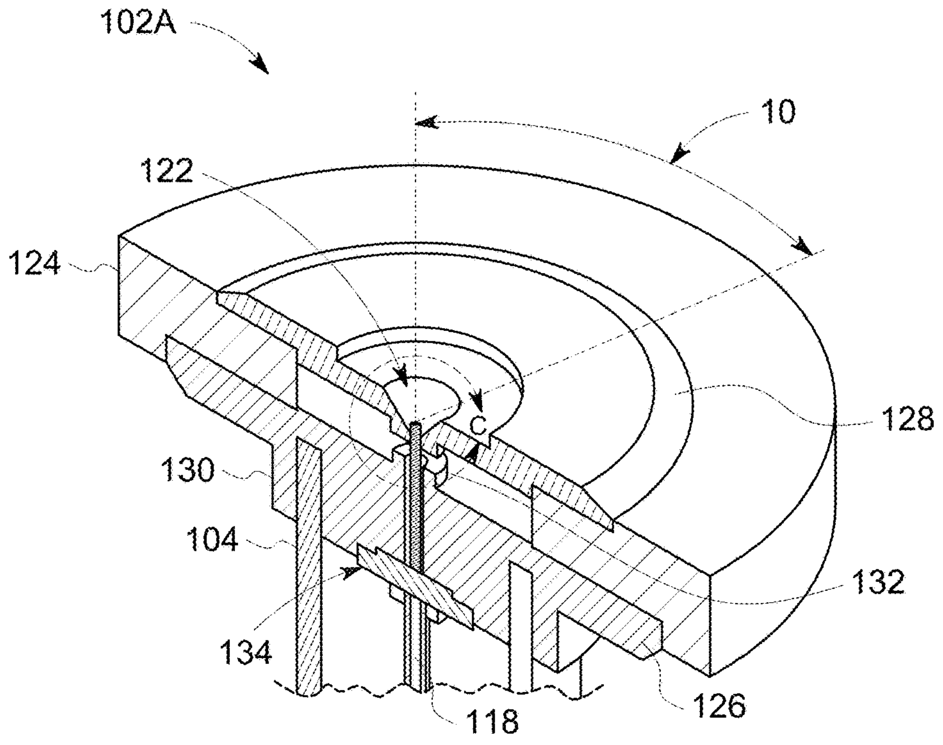
FIG. 2D illustrates an enlarged sectional view of the bi-conical variant antenna along line B-B in FIG. 2B, in accordance with embodiments of the invention.
Figure 2E:
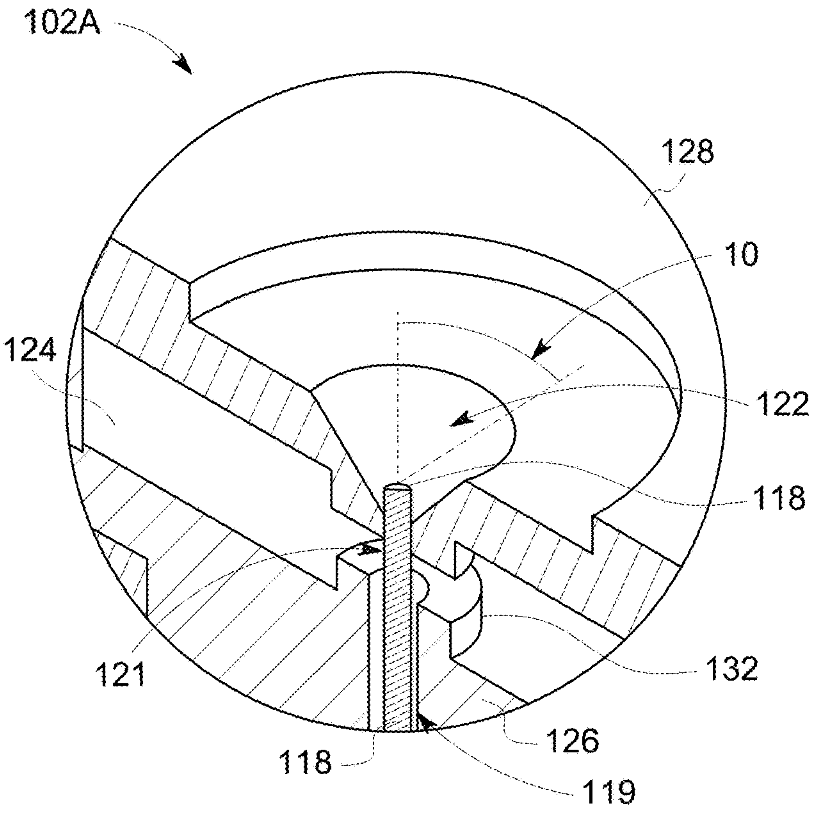
FIG. 2E illustrates an enlarged sectional view of area C in FIG. 2D, in accordance with embodiments of the invention.

Referring to FIGS. 2C and 2D, the first conducting base 126 comprises a first conducting body, a first concave formation 134, and a first feed conduit 119. Similarly, the second conducting base 128 comprises a second conducting body, a second concave formation 122, and a second feed conduit 121. The two openings of the cylindrical bi-cone (or bi-cylindrical antenna unit) are designed with 0° half-cone angle to make the radiating aperture small resulting in wide coverage beam.

The first conducting body and the second conducting body are made of copper-alloy discs. Using solid structures like the discs increases the durability of the bi-conical variant antenna 102A, when combined with the radome 124, as seen in FIGS. 2A and 2B. Further, the first and second conducting bodies of the first conducting base 126, along with the radome 124, firmly enclose and protect the transmission gap 132 formed within the bi-conical variant antenna 102A.

In one embodiment, the bi-conical variant antenna 102A comprises the first concave formation 134 and the second concave formation 122. The concave formations (122, 134) are configured to create polar indentations that can adjust the broadcast qualities of the bi-conical variant antenna 102A, resulting in an effective beamwidth. Further, the angular qualities of the concave formations (122, 134) also impact the transmission qualities and final beamwidth of the communication cable 118 within the first feed conduit 119 and the second feed conduit 121, which are conventionally referred to in terms of illumination taper.

In another embodiment, the first concave formation 134 is situated opposite the transmission gap 132 across the first conducting body. The first feed conduit 119 runs between the transmission gap 132 and the first concave formation 134 via the first conducting body. Similarly, the second concave formation 122 is located opposite the transmission gap 132 across the second conducting body, and the second feed conduit 121 runs between the second concave formation 122 and the transmission gap 132 via the second conducting body.

This arrangement creates a linear clearance between and through both the first conducting body and the second conducting body, allowing the communication cable 118 to be fully exposed to the transmitted signals. In a reverse arrangement, the first and second conducting bodies are uniformly situated around the communication cable 118 to augment both incoming and outgoing signals. In one embodiment, the communication cable 118 is placed inside the second concave formation 122 through the first feed conduit 119, the transmission gap 132, and the second feed conduit 121. The uncovered communication cable 118 inside the second concave aperture significantly influences the beamwidth adjacent to the boresight, as the terminal end of the communication cable 118 and the second concave formation 122 together produce a miniaturized antenna structure. Similarly, the section of the communication cable 118 that passes through the first concave formation 134 affects the backside beamwidth by the same functional arrangement.

In another embodiment, the dimensions of the communication cable 118 may be adjusted to optimize the arrangement and dimensions of the second concave formation 122 and the communication cable 118 to maximize the boresight-adjacent beamwidth.

As indicated in FIG. 2C, an aperture diameter of the second concave formation 122 is approximately 0.432, relative to any signal wave. The proposed aperture diameter of the second concave formation 122 is effective for the operation of the bi-conical variant antenna 102A, which is used in conjunction with the other features designed to realize wide coverage beam.

In one embodiment, the communication cable 118 is positioned at 0° incident to the second concave formation 122 to create a uniform beamwidth about the boresight vector. This configuration ensures that signal strength is maximized while minimizing unwanted interference. Overall, these design features enhance the performance and reliability of the communication system.

Referring to FIG. 2A-2E, the first support rod 104 is intended to be a collapsible, man-portable antenna mast that can be used in both COTM and CATH configurations. The first conducting base 126 houses an antenna connector 130 that is designed to accept and securely hold the terminal end of the first support rod 104, without significantly compromising the broadcast capabilities of the first conducting base 126. The antenna connector 130 is located opposite the second conducting base 128, across the transmission gap 132, with the first support rod 104 mounted into the antenna connector 130.

In another embodiment, the antenna connector 130 serves as a mounting and receiving area for any interconnection components such as splices, cable adapters, terminal coaxial connectors, and the like that may be necessary to adapt external communications equipment for use with the present invention. The antenna connector 130 also helps to minimize any scattering effects induced by the first support rod 104, within the resultant functional beamwidth between 90° to 180°. This is achieved by enclosing the non-conductive material of the first support rod 104 with the conducting material of the first conducting base 126, thereby preventing any significant constrictions of the beamwidth due to unrouteable interference from the first support rod 104.

In another embodiment, the radome 124 is constructed with non-interfering and radio-transparent material such as rigid dielectric insulator. The material has an overall diameter of approximately 1.91". This diameter optimizes weight and bulk, minimizing the silhouette and profile of the radome 124 while preserving the protective qualities of the radome 124 for the communication cable 118. Further, the diameter is ideal for containing an appropriately scaled instance of the transmission gap 132 without introducing an excess of signal scattering due to over-construction of the radome material, regardless of the dielectric qualities thereof. This consideration is particularly relevant in combat applications, where the weight and size of equipment carried by individual troopers is critical to their performance.

In some embodiments, the radome 124 is made of a dielectric polymer composite such as rexolite for this application due the low dissipation factor and high standards of mechanical and thermal resistance, i.e., structural durability. The machinability and post-processing capabilities of this material are also identified as superior to contemporary options, although it is understood that this material may be supplanted by future developments without departing from the original spirit and scope of the present invention.

Further, according to the preferred embodiment of the present invention, a combined longitudinal dimension of the first conducting base 126, the radome 124, and the second conducting base 128 is 0.48". The combined longitudinal dimension constitutes the full extent of any antenna structures extending between the boresight-end and the backside-end of the asymmetric bi-conical antennae structure. In addition to the inherent benefits of a compact antenna structure as outlined above, it is proposed that the combined dimensions of the antennae structure at 1.61" by 0.48" creates an optimized structure for transmitting messages in the K-band (including the sub-bands of Ka and Ku). This optimization accounts for the broadcast power of a single man-portable communications system, the typical range and fidelity of said communications, and provides a maximal benefit within the boundaries of the proposed dimensional limits using the antenna profile.

Figure 3B:
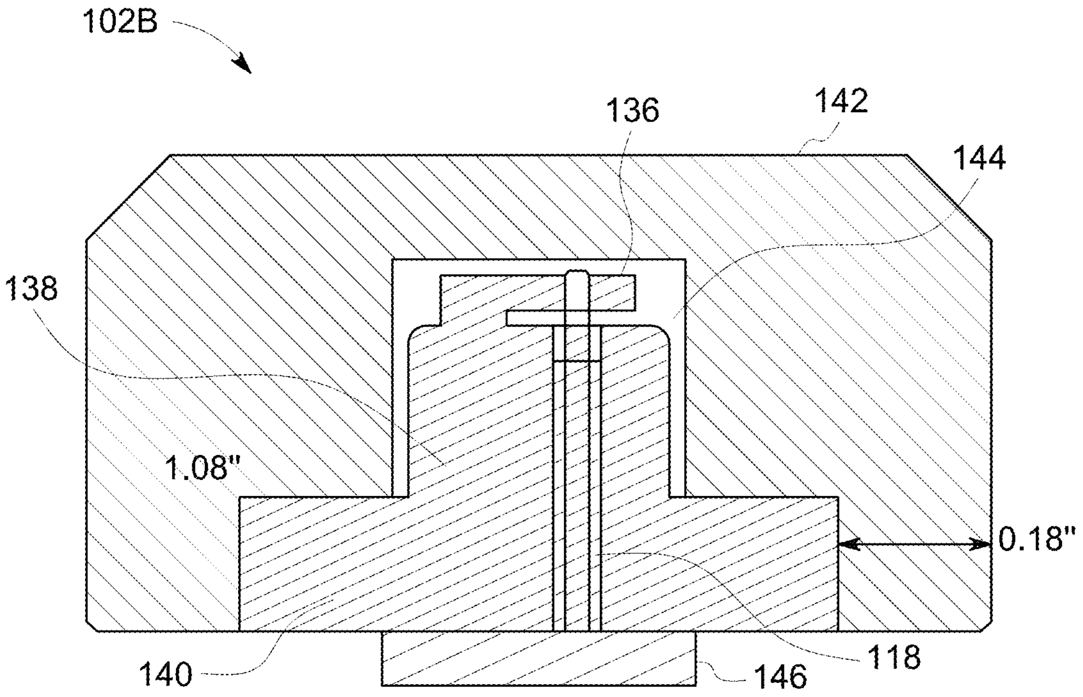
FIG. 3B illustrates a cross-sectional view of the inverted-F variant antenna, in accordance with embodiments of the invention.
Figure 3C:
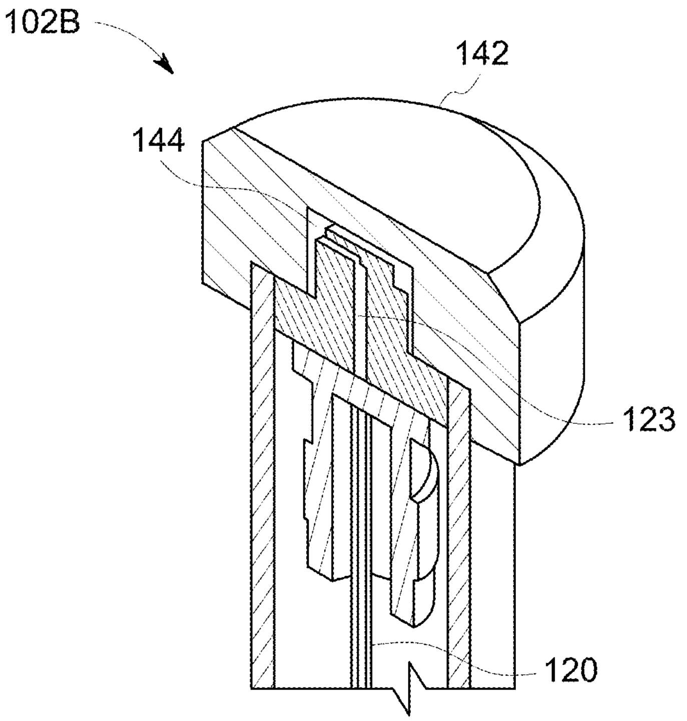
FIG. 3C illustrates a sectional view of the inverted-F variant antenna attached to the deployable manpack antenna assembly, in accordance with embodiments of the invention.

FIGS. 3A-3C refer to the inverted-F variant antenna 102B with a single feed point. The inverted-F variant antenna 102B is configured for maximal antenna gain coverage in a direction perpendicular to antenna surface, thereby improving the overall coverage area.

The inverted-F variant antenna 102B comprises a radiating patch element 136 mounted on a podium 138 and connected to a ground plane 140 or base. A protective radome 142 made of rexolite that encloses the radiating patch element 136 with an air gap 144 for improved signal transmission. The coaxial connector 146 provides the connection point for the communication cable 118. The communication cable 118 connects the inverted-F variant antenna 102B to the base unit 110. This communication cable 118 is routed through the cable conduit 120 and a feed conduit 123, as shown in FIG. 3C.

In one embodiment, the ground plane is made of a metallic material. Further, a shaped ground plane is utilized for wider coverage, and a standard 2.92 mm coaxial connector 146. The protective radome 142 has relative permittivity 2.53, and low dissipation factor. The thickness of the protective radome 142 is optimized for performance.

In another embodiment, the inverted-F variant antenna 102B comprises a conduit for receiving the communication cable 118, as shown in FIG. 3C.

In one embodiment, the diameter of the protective radome 142 varies from 25 to 29 mm. The diameter of the radiating patch element 136 varies from 4 to 6 mm. The diameter of the ground plane 140 varies from 16 to 20 mm. The height of the inverted-F variant antenna 102B varies from 13 to 15 mm. The distance between the radiating patch element 136 till the top of the ground plane 140 varies from 4 to 6 mm. The width of the ground plane 140 varies from 3.5 to 4.5 mm. These measurement may vary based on the requirements.

Figure 4A:
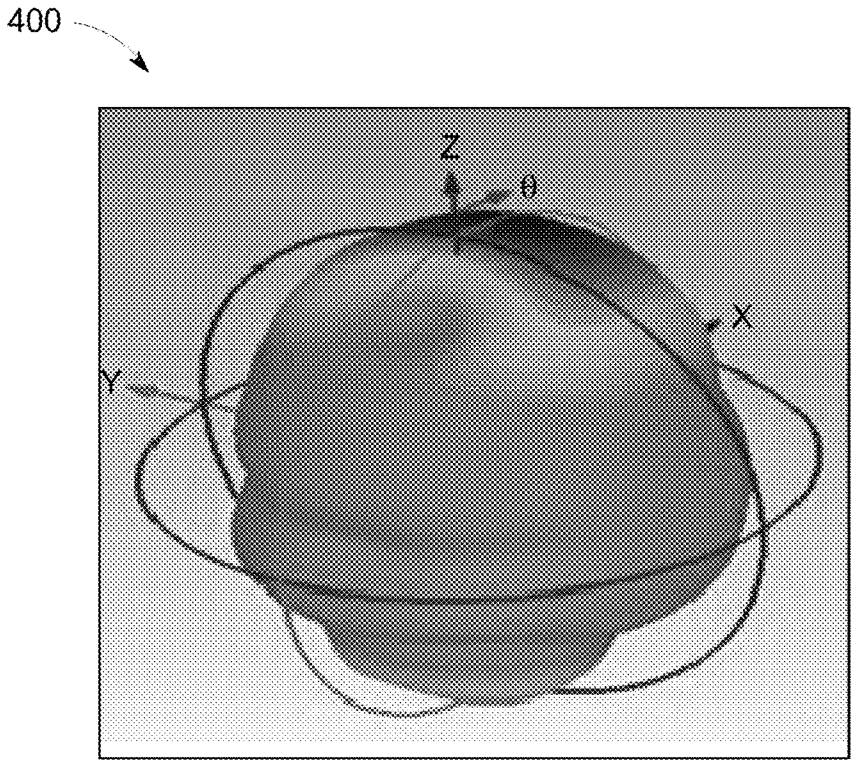
FIG. 4A illustrates a radiation pattern map of the inverted-F variant antenna without support rod, in accordance with embodiments of the invention.
Figure 4B:
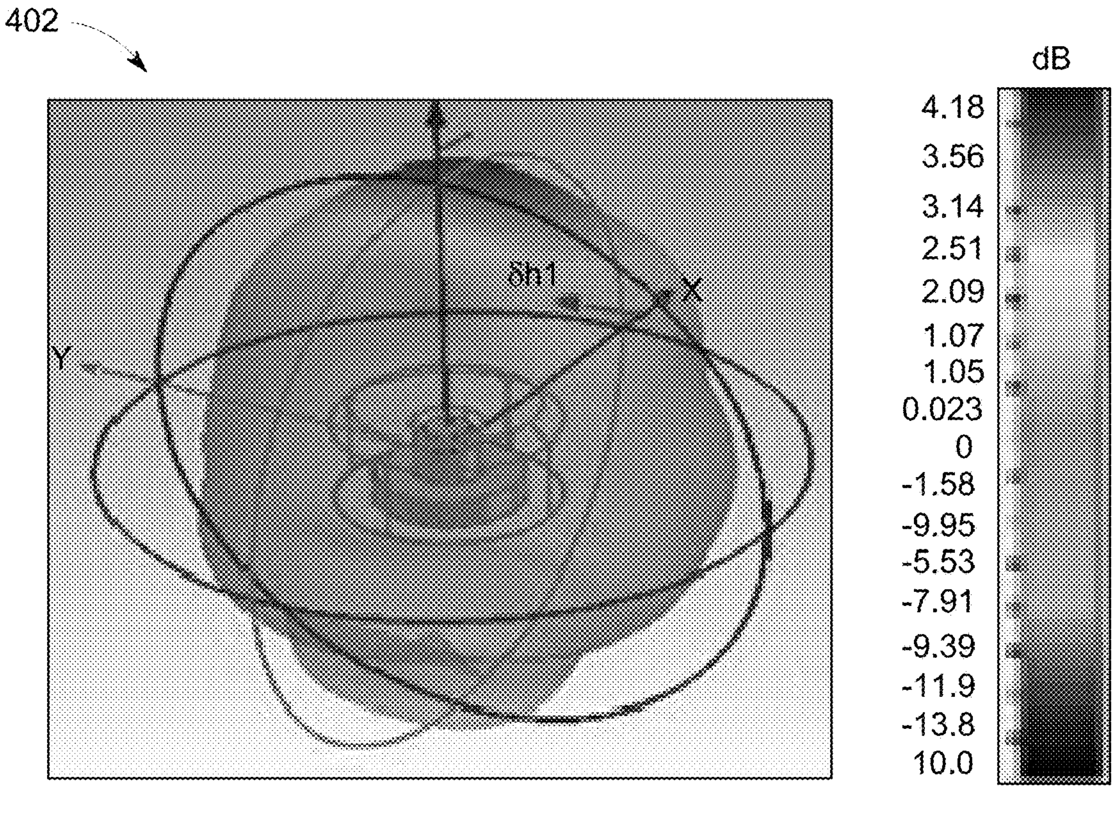
FIG. 4B illustrates a radiation pattern map of the inverted-F variant antenna, wherein the coverage range represents an unmounted 'free space' configuration, in accordance with embodiments of the invention.

FIG. 4A refers to a radiation pattern map 400 of the inverted-F variant antenna 102B without first support rod 104. FIG. 4B refers to a radiation pattern map 402 of the inverted-F variant antenna 102B, wherein the coverage range represents an unmounted ‘free space’ configuration.

Figure 4C:
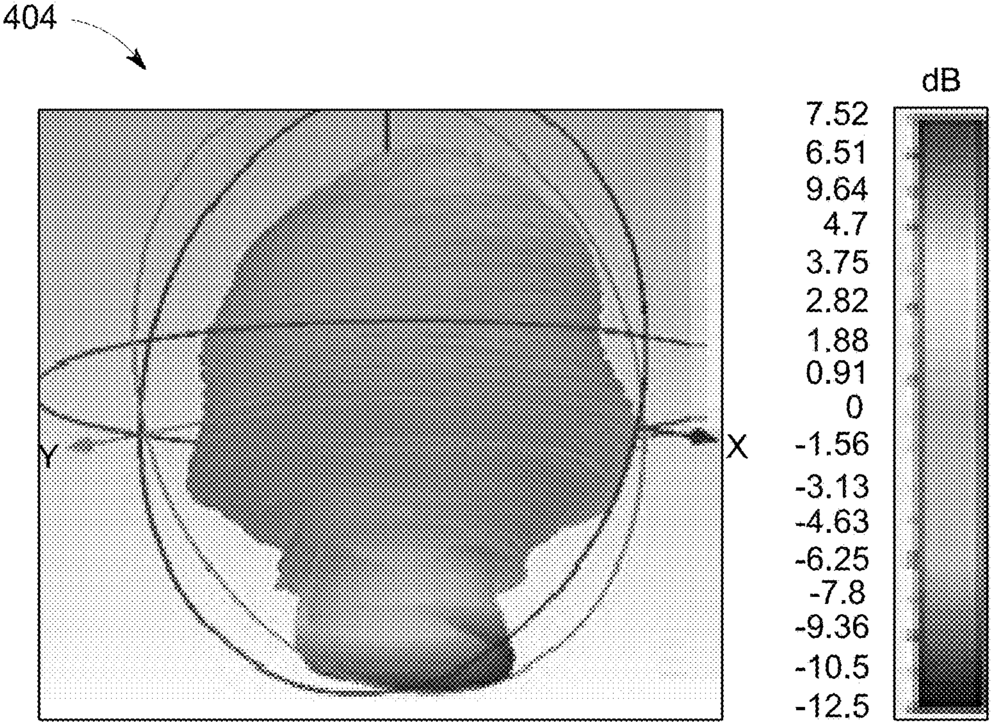
FIG. 4C illustrates a radiation pattern map of the inverted-F variant antenna, wherein the coverage range represents a mounted configuration using a support structure in an extended position, in accordance with embodiments of the invention.
Figure 4D:
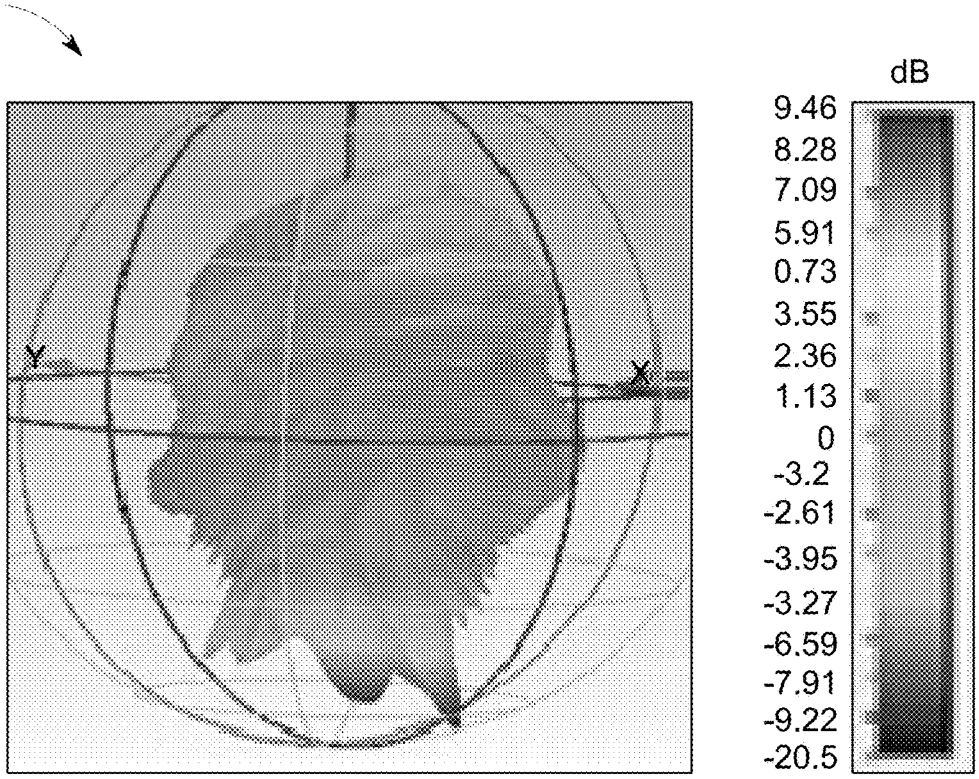
FIG. 4D illustrates a radiation pattern map of the inverted-F variant antenna, wherein the coverage range represents a mounted configuration using the support structure in a folded or stowed position, in accordance with embodiments of the invention.

FIG. 4C refers to a radiation pattern map 404 of the inverted-F variant antenna 102B, wherein the coverage range represents a mounted configuration using the first support rod 104 in an extended position. FIG. 4D refers to a radiation pattern map 406 of the inverted-F variant antenna 102B, wherein the coverage range represents a mounted configuration using the first support rod 104 in a folded position.

In another embodiment, at −6.5 dBi, the coverage % for the inverted-F variant antenna 102B varies from 100 to 97%. The inverted-F variant antenna 102B achieves at least 90% of 4π steradians coverage at −6.5 dBi threshold with 2.4 dB insertion loss.

Figure 5:
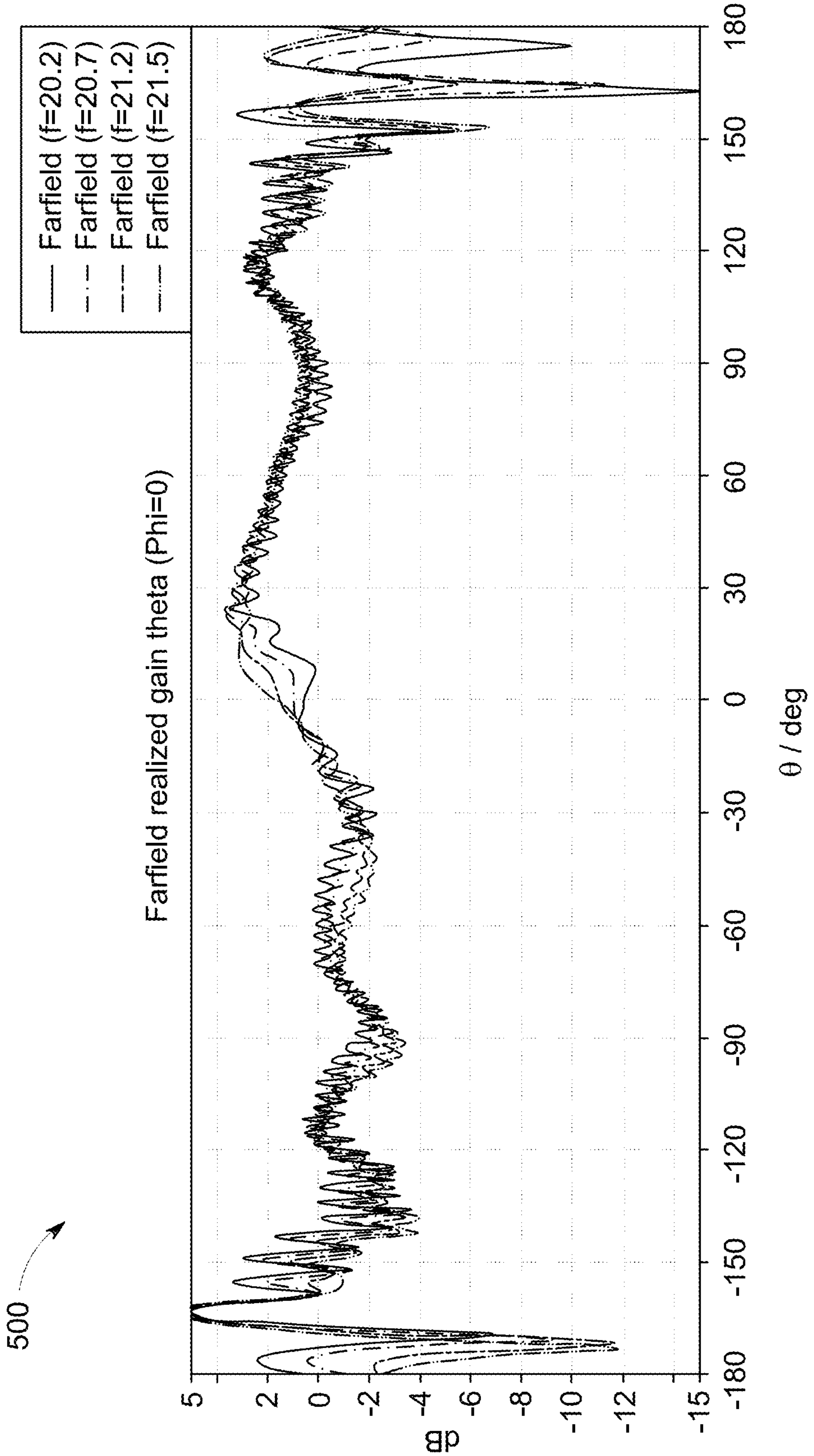
FIG. 5 illustrates a graph containing the radiation patterns of the inverted-F variant antenna with support rod and radome, in accordance with embodiments of the invention.

FIG. 5 illustrates a graph 500 containing the radiation patterns of the inverted-F variant antenna 102B with the first support rod 104 and the protective radome 142. The inverted-F variant antenna 102B provide minimum guaranteed coverage level. In this case, The inverted-F variant antenna 102B provides at least 99.2% of the omnidirectional 4π steradians coverage area at a frequency of 20.2 GHZ.

Figure 6:
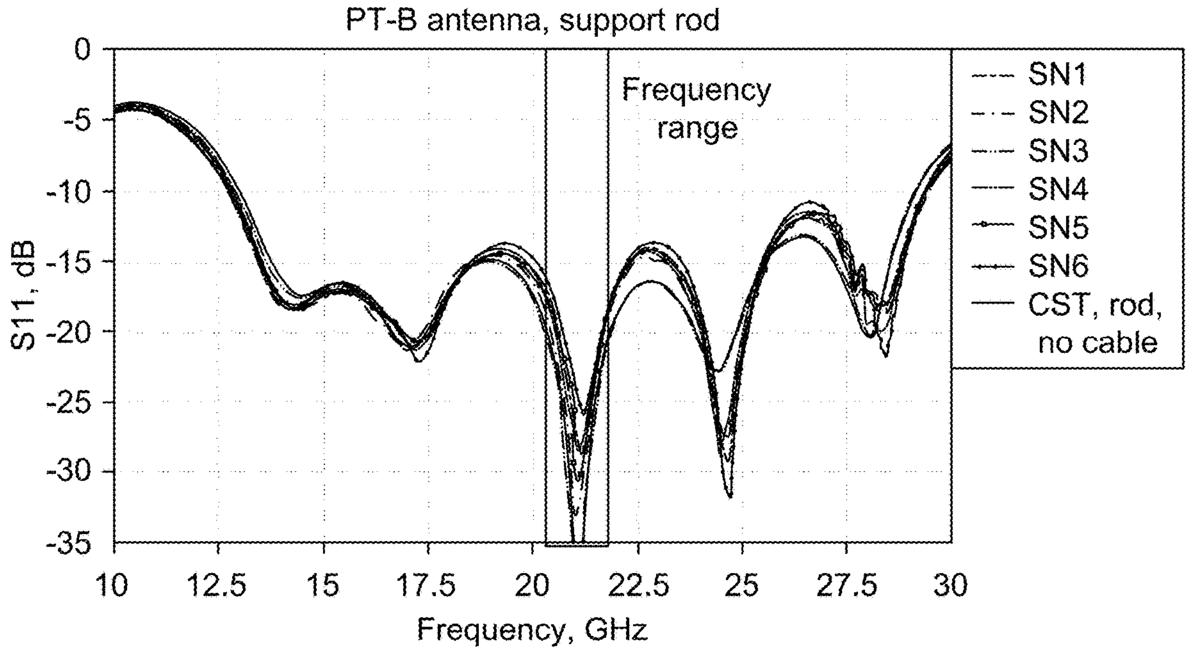
FIG. 6 illustrates a graph containing the measured return loss of >10 dB for the bi-conical variant antenna over the K, Ka, and Ku bands, in accordance with embodiments of the invention.

FIG. 6 refers a graph 600 containing the measured return loss of the bi-conical variant antenna 102A over the K, Ka, and Ku bands showing >10 dB return loss. the half-power beamwidth (3 dB) resulting from this assembly extends approximately 70° bidirectionally across 90° angle, benefiting from both the collimated signal wave through the communication cable 118 and the secondary effects of the segments of the communication cable 118 positioned within the first concave formation 134 and the second concave formation 122. This beamwidth represents a significant improvement over conventional bi-conical antenna structures with a comparable half-power beamwidth of 20° bidirectionally across 90° angle.

The bi-conical variant antenna 102A without the first support rod 104 is very compact and is 1.9" (48.3 mm) diameter and 0.48" (12.3 mm) long with low mass of 66 grams. Measured return loss of the 6 units along with computed results are shown in FIG. 6. The bi-conical variant antenna 102A exhibits wide bandwidth performance with RL better than 10 dB over 12.5 to 29.0 GHz.

Figure 7A:
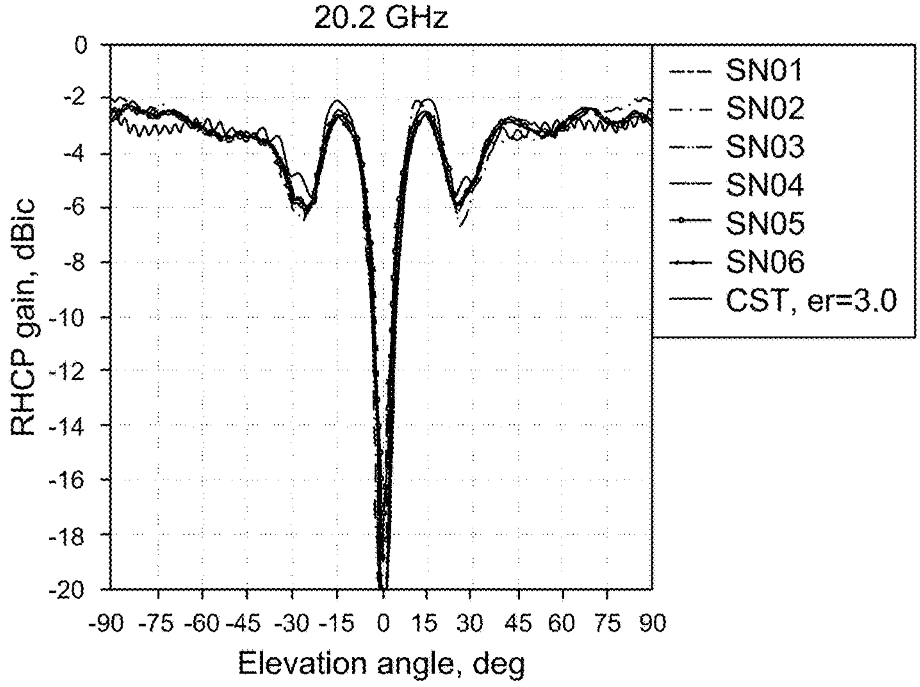
FIG. 7A illustrates a graph containing the measured radiation patterns of six fabricated units of the bi-conical variant antenna along the forward hemi-sphere, compared against simulated results, wherein an operating frequency of 20.2 GHz is used, in accordance with embodiments of the invention.
Figure 7B:
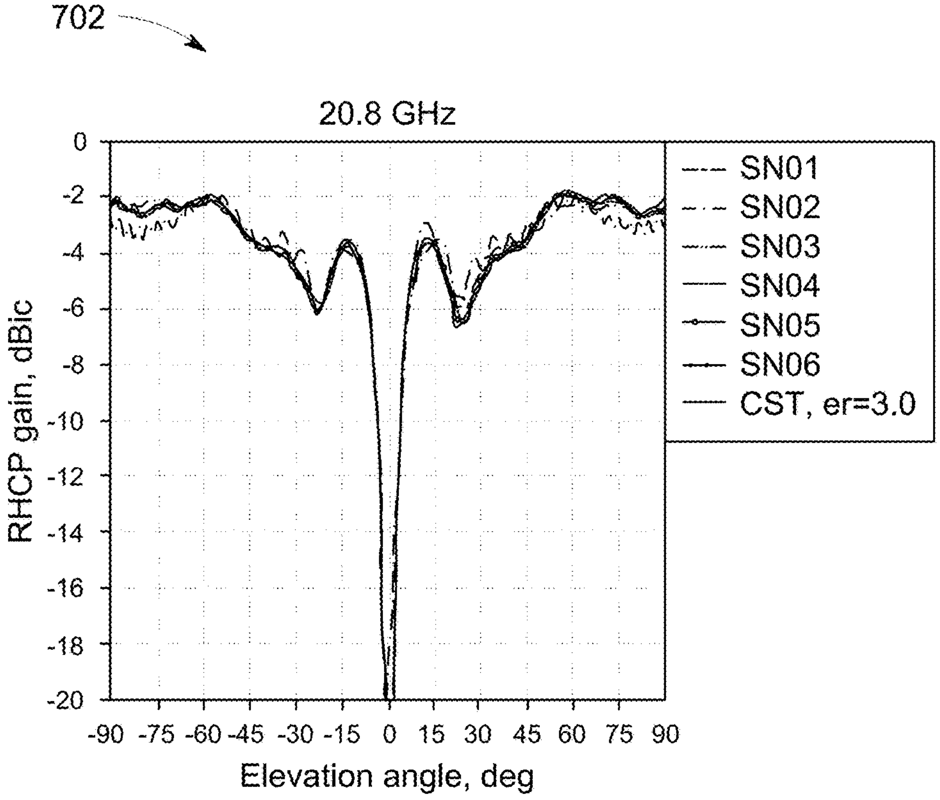
FIG. 7B illustrates a graph containing the measured radiation patterns of six fabricated units of the bi-conical variant antenna along the forward hemi-sphere, compared against simulated results, wherein an operating frequency of 20.8 GHz is used, in accordance with embodiments of the invention.
Figure 7C:
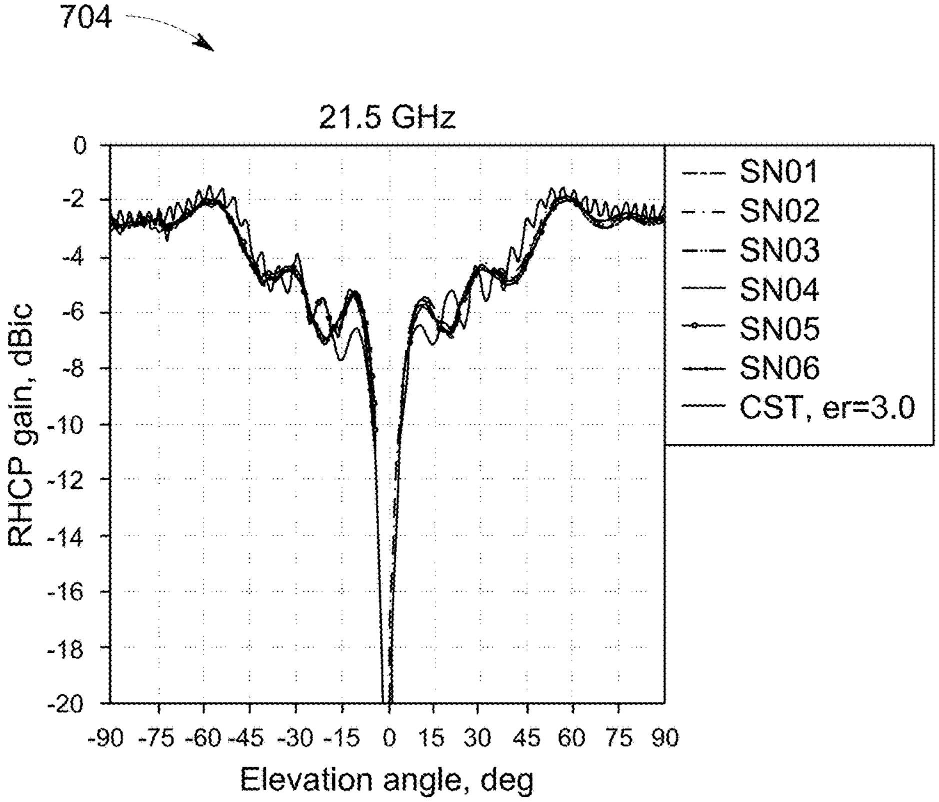
FIG. 7C illustrates a graph containing the measured radiation patterns of six fabricated units of the bi-conical variant antenna along the forward hemi-sphere, compared against simulated results, wherein an operating frequency of 21.5 GHz is used, in accordance with embodiments of the invention.

FIG. 7A illustrates a graph 700 containing the measured radiation patterns of six fabricated units of the bi-conical variant antenna 102A along the forward hemi-sphere, compared against simulated results, wherein an operating frequency of 20.2 GHz is used. FIG. 7B illustrates a graph 702 containing the measured radiation patterns of six fabricated units of the bi-conical variant antenna 102A along the forward hemi-sphere, compared against simulated results, wherein an operating frequency of 20.8 GHz is used. FIG. 7C illustrates a graph 704 containing the measured radiation patterns of six fabricated units of the bi-conical variant antenna 102A along the forward hemi-sphere, compared against simulated patterns, wherein an operating frequency of 21.5 GHz is used. The forward radiation patterns in the forward direction ($-90° < \theta < +90°$) of the six units are measured and are shown in FIG. 7A to 7C. The computed patterns shown in dark at the center frequency closely match with the radiation patterns of the six units.

Figure 8A:
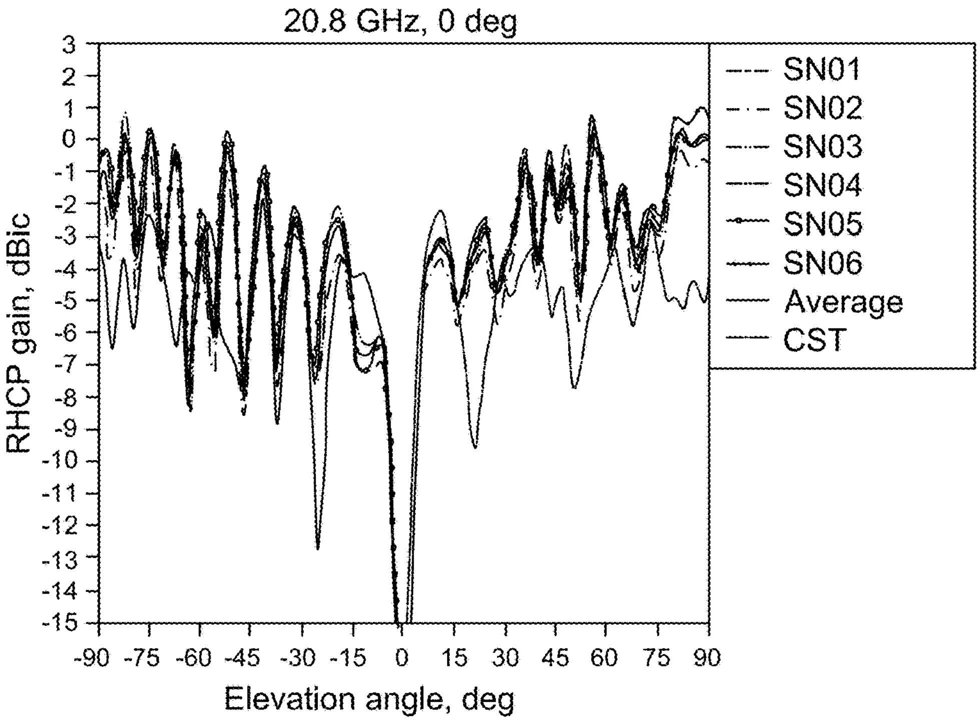
FIG. 8A illustrates a graph containing the measured radiation patterns of six fabricated units of the bi-conical variant antenna along the backward hemi-sphere, compared against simulated results, wherein an operating frequency of 20.8 GHz is used, in accordance with embodiments of the invention.

FIG. 8A illustrates a graph 800 containing the measured radiation patterns of the six fabricated units of the bi-conical variant antenna 102A along the backward hemi-sphere, compared against simulated patterns, wherein an operating frequency of 20.8 GHz is used.

Figure 8B:
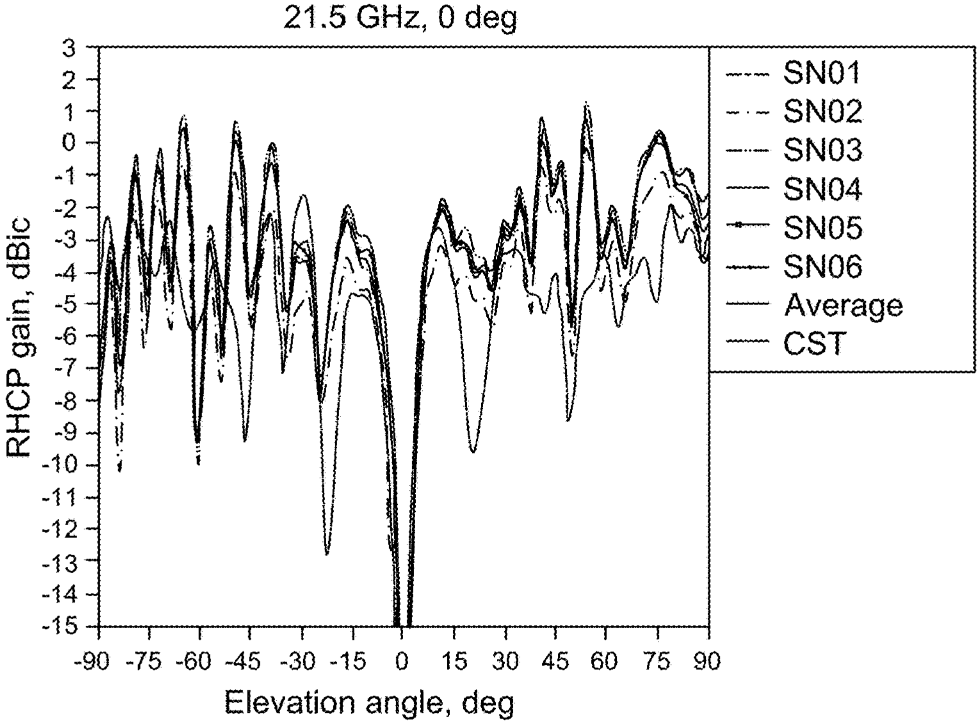
FIG. 8B illustrates a graph containing the measured radiation patterns of six fabricated units of the bi-conical variant antenna along the backward hemi-sphere, compared against simulated results, wherein an operating frequency of 21.5 GHz is used, in accordance with embodiments of the invention.

FIG. 8B illustrates a graph 802 containing the measured radiation patterns of the six fabricated units of the bi-conical variant antenna 102A along the backward hemi-sphere, compared against simulated results, wherein an operating frequency of 21.5 GHz is used. Radiation patterns in the backward hemi-sphere, shown in FIGS. 8A and 8B, have been measured with the antenna range test set-up where care is taken to support the bi-conical variant antenna 102A with non-metallic wooden support structure so that the deployable manpack antenna assembly 100.

In another embodiment, the deployable manpack antenna assembly 100 comprises a deployment mechanism to facilitate the switching between COTM and CATH operations. In both operational scenarios, the antenna is located far from the soldier's head to prevent RF (Radio Frequency) radiation to the head.

In another embodiment, the deployable manpack antenna assembly 100 is a lightweight and compact antenna that is essential for future ground communication systems. The deployable manpack antenna assembly 100 is designed to provide wide angle 4π steradians coverage for man-pack radio communication units carried by soldiers on the ground. The deployable manpack antenna assembly 100 comprises two antennas, the biconical variant antenna 102A, and the inverted-F variant antenna 102B, both of which operate at K-band. The deployable manpack antenna assembly 100 boasts several features, including antenna deployment from folded to unfolded configurations, compact size, low mass, 4π steradians coverage, low cost, wide bandwidth performance, and built-in radome for protection from severe environmental conditions.

In another embodiment, the deployable manpack antenna assembly 100 comprises trades, RF simulations, mechanical design, antenna deployment, and material selection leading to product development. The deployable manpack antenna assembly 100 has a very wide frequency bandwidth of at least 90%, covering Ku and Ka secondary frequency bands in addition to its primary K-band. In some embodiments, the deployable manpack antenna assembly 100 will replace three antennas on a dedicated man-pack with a single tri-band antenna solution.

In another embodiment, the deployable manpack antenna assembly 100 requires almost 4π steradians of coverage (full sphere) with elevation coverage of +/−180°. This is achieved by using half-angle of the cone of 0°. This can also be called bi-cylindrical antenna instead of bi-conical antenna. The aperture opening is about 0.45 wavelengths giving the required wide-angle coverage.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principles of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

It will readily be apparent that numerous modifications and alterations can be made to the processes described in the foregoing examples without departing from the principles underlying the invention, and all such modifications and alterations are intended to be embraced by this application.

The claimed invention is:

1. A deployable manpack antenna assembly, comprising:

a transceiver antenna unit attached at one end of a first support rod, wherein the transceiver antenna unit is configured to provide substantial omnidirectional coverage;

a base unit attached at one end of a second support rod, wherein the second support rod is releasably engaged with the first support rod through a clamping unit in a stowed configuration;

a mechanically deployable assembly configured to enable stowed and deployed configurations for the deployable manpack antenna assembly, wherein the mechanically deployable assembly comprises:

a flexible conduit connector terminally connected between the first support rod and the second support rod, wherein the flexible conduit connector is configured to enable relative positioning of the transceiver antenna unit relative to the base unit; and a latching unit configured to releasably fix the orientation of the first support rod relative to the second support rod in a deployed configuration; and a cable conduit traversing the first support rod, the flexible conduit connector, and the second support rod, wherein the cable conduit is configured to receive at least one communication cable, which is connected between the transceiver antenna unit and the base unit.

2. The deployable manpack antenna assembly of claim 1, wherein the transceiver antenna unit is a bi-conical variant antenna, wherein the bi-conical variant antenna is configured for maximal coverage gain in a direction relative to the first support rod.

3. The deployable manpack antenna assembly of claim 1, wherein the transceiver antenna unit is an inverted-F variant antenna fed with a single feed point, wherein the inverted-F variant antenna is configured for maximal antenna gain coverage in a direction perpendicular to antenna surface, thereby improving the overall coverage area.

4. The deployable manpack antenna assembly of claim 1, wherein the base unit further comprises a mounting flange, and a terminal coaxial connector, wherein the mounting flange extending radially from the second support rod, the at least one communication cable passed through the mounting flange and traverses the second support rod, the terminal coaxial connector is mounted to the mounting flange, receiving one end of the at least one communication cable, wherein the terminal coaxial connector is electrically connected to the at least one communication cable, and the terminal coaxial connector is configured to electrically connect the transceiver antenna unit to an external terminal.

5. The deployable manpack antenna assembly of claim 1, wherein the latching unit includes, but not limited to, a sleeve, a first sleeve retainer stop and a second sleeve retainer stop.

6. The deployable manpack antenna assembly of claim 5, wherein the sleeve is configured to be slidably mounted onto the first support rod, adjacent to the flexible conduit connector, wherein the sleeve is configured to slide over the flexible conduit connector to fix the second support rod and the first support rod in the deployed configuration.

7. The deployable manpack antenna assembly of claim 5, wherein the first sleeve retainer stop is mounted to the second support rod, proximal to the flexible conduit connector, wherein the second sleeve retainer stop is mounted to the first support rod, proximal to the transceiver antenna unit.

8. The deployable manpack antenna assembly of claim 1, wherein the clamping unit includes at least one connector configured to enable a user to detachably connect the first support rod with the second support rod.

9. The deployable manpack antenna assembly of claim 1, wherein the clamping unit comprises a collar, a connecting strut, and a clasp, wherein the collar is configured to be flexibly connected to the second support rod between the flexible conduit connector and the base unit, the connecting strut is configured to be laterally mounted to the collar, perpendicular to the second support rod, the clasp is configured to be terminally connected to the connecting bar, positioned across the connecting bar from the collar, and the first support rod being releasably engaged to the clasp, wherein the stowage clamp fixes the second support rod and the first support rod into the stowed configuration.

10. A deployable manpack antenna assembly, comprising:

a bi-conical variant antenna attached at one end of a first support rod, wherein the bi-conical variant antenna is configured for maximal coverage along lateral vectors perpendicular to the first support rod;

a base unit attached at one end of a second support rod, wherein the second support rod is releasably engaged with the first support rod through at least one stowage clamp in a stowed configuration;

a flexible conduit connector terminally connected between the first support rod and the second support rod, wherein the flexible conduit connector is configured to enable relative positioning of the bi-conical variant antenna relative to the base unit;

a latching unit slidably mounted onto the first support rod, wherein the latching unit is configured to slide over the flexible conduit connector to fix the second support rod and the first support rod in a deployed configuration;

a cable conduit traversing the first support rod, the flexible conduit connector, and the second support rod; and at least one communication cable positioned into the cable conduit, wherein the at least one communication cable is connected between the bi-conical variant antenna and the base unit.

11. The deployable manpack antenna assembly of claim 10, wherein the base unit further comprises a mounting flange, and a terminal coaxial connector.

12. The deployable manpack antenna assembly of claim 11, wherein the mounting flange is configured to extend radially from the second support rod.

13. The deployable manpack antenna assembly of claim 11, wherein the at least one communication cable is passed through the mounting flange and traverses the second support rod.

14. The deployable manpack antenna assembly of claim 11, wherein the terminal coaxial connector is mounted to the mounting flange, thereby receiving one end of the at least one communication cable, wherein the terminal coaxial connector is configured to electrically connect the transceiver assembly to an external terminal.

15. The deployable manpack antenna assembly of claim 10, wherein the latching unit comprises a first sleeve retainer stop that is mounted to the second support rod, proximal to the flexible conduit connector, and a second sleeve retainer stop that is mounted to the first support rod, proximal to the transceiver antenna unit.

16. A deployable manpack antenna assembly, comprising an inverted-F variant antenna attached at one end of a first support rod, wherein the inverted-F variant antenna is configured for maximal coverage with peak antenna gain in a direction perpendicular to antenna surface;

a base unit attached at one end of a second support rod, wherein the second support rod is releasably engaged with the first support rod through at least one stowage clamp in a stowed configuration;

a flexible conduit connector terminally connected between the first support rod and the second support rod, wherein the flexible conduit connector is configured to enable relative positioning of the inverted-F variant antenna relative to the base unit;

a latching unit slidably mounted onto the first support rod, wherein the latching unit is configured to slide over the flexible conduit connector to fix the second support rod and the first support rod in a deployed configuration; and a cable conduit traversing the first support rod, the flexible conduit connector, and the second support rod, wherein the cable conduit is configured to receive at least one communication cable, which is connected between the inverted-F variant antenna and the base unit.

17. The deployable manpack antenna assembly of claim 16, wherein the base unit further comprises a mounting flange, and a terminal coaxial connector.

18. The deployable manpack antenna assembly of claim 17, wherein the mounting flange is configured to extend radially from the second support rod.

19. The deployable manpack antenna assembly of claim 17, wherein the at least communication cable is passed through the mounting flange and traverses the second support rod.

20. The deployable manpack antenna assembly of claim 17, wherein the terminal coaxial connector is mounted to the mounting flange, thereby receiving one end of the at least one communication cable, wherein the terminal coaxial connector is configured to electrically connect the transceiver assembly to an external terminal modem.

* * * * *